(12) United States Patent
Dobson, Jr. et al.

(10) Patent No.: US 7,897,544 B2
(45) Date of Patent: Mar. 1, 2011

(54) COMPOUNDED HYDROCARBON OIL AND OIL BASE DRILLING FLUIDS PREPARED THEREFROM

(75) Inventors: James W. Dobson, Jr., Houston, TX (US); Jorge M. Fernandez, Houston, TX (US); Kim O. Tresco, Houston, TX (US); Abmel Marquez Perez, Caracas (VE)

(73) Assignee: Texas United Chemical Company, LLC, Houston, TX (US)

( * ) Notice: Subject to any disclaimer, the term of this patent is extended or adjusted under 35 U.S.C. 154(b) by 968 days.

(21) Appl. No.: 11/305,602

(22) Filed: Dec. 16, 2005

(65) Prior Publication Data

US 2006/0148654 A1 Jul. 6, 2006

Related U.S. Application Data

(60) Provisional application No. 60/641,239, filed on Jan. 4, 2005.

(51) Int. Cl.
*C09K 8/32* (2006.01)
(52) U.S. Cl. .............. 507/103; 507/138; 507/203; 507/265
(58) Field of Classification Search ............. 507/103, 507/138, 203, 265
See application file for complete search history.

(56) References Cited

U.S. PATENT DOCUMENTS 4,439,328 A * 3/1984 Moity .................. 507/204
5,376,629 A * 12/1994 Smith .................. 507/127
5,385,907 A    1/1995 Asakura et al.
5,846,915 A * 12/1998 Smith et al. .............. 507/269

FOREIGN PATENT DOCUMENTS

GB    2297103 A * 7/1996

OTHER PUBLICATIONS

Definition of diesel oil, Hawley's Chemical dictionary 2002.*
European Search Report for corresponding European Patent Application No. 05258016.4.
Written Opinion for corresponding European Patent Application No. 05258016.4.

* cited by examiner

*Primary Examiner*—Randy Gulakowski
*Assistant Examiner*—Alicia Toscano
(74) *Attorney, Agent, or Firm*—Locke Lord Bissell & Liddell LLP

(57) ABSTRACT

The invention discloses a compounded hydrocarbon oil which comprises a base hydrocarbon oil, preferably a mixture of paraffinic hydrocarbons, propylene carbonate, and a liquid fatty acid containing at least 12 carbon atoms per molecule, preferably tall oil fatty acid. The volume ratio of propylene carbonate to liquid fatty acid is from about 3.5 to 1 to about 7 to 1. Preferably the concentration of propylene carbonate is from about 0.002 gal/gal oil to about 0.0057 gal/gal oil and the concentration of the liquid fatty acid is from about 0.0003 gal/gal oil to about 0.0015 gal/gal oil. The invention further comprises a method of compounding the compounded hydrocarbon oil and an oil base drilling fluid prepared from the compounded hydrocarbon oil. Preferably the compounded hydrocarbon oil is characterized by an increase in the low shear rate viscosity of the oil of at least 5,000 centipoise or mixing 7.5 lb/bbl of an organoclay therein.

9 Claims, No Drawings

COMPOUNDED HYDROCARBON OIL AND OIL BASE DRILLING FLUIDS PREPARED THEREFROM

This application claims benefit under 35 U.S.C. 119(e)(1) of provisional application 60/641,239 filed Jan. 4, 2005.

BACKGROUND OF THE INVENTION

The invention pertains to oil base drilling fluids and methods of and compositions for making such fluids.

Oil base drilling fluids are well known in the art of drilling oil and/or gas wells. Generally they comprise (1) an oleaginous liquid, such as a hydrocarbon oil, a synthetic oil such as esters and ethers, and synthesized hydrocarbons such as internal olefins, alphaolefins, polyalphaolefins, and the like; (2) a viscosifier/suspension agent to keep the solids in the fluids suspended therein; (3) a weight material to impart the desired density to the fluid; and (4) other additives such as fluid loss control agents, emulsifiers, oil wetting agents, brines, and the like.

Most oil base drilling fluids are invert (water-in-oil) emulsions wherein an aqueous phase is dispersed within the oleaginous phase. The aqueous phase, which generally comprises a solution of an inorganic salt such as calcium chloride, is stabilized by one or more emulsifiers which are effective in invert emulsions. These include the various fatty acid soaps, including oxidized tall oil soaps, preferably the calcium soaps whether pre-formed or prepared in-situ in the fluid, polyamides, alkylamidoamines, imidazolines, alkyl sulfonates, fatty acyl esters, lecithin and the like. These include so-called primary emulsifiers, secondary emulsifiers. See for example the following U.S. Pat. Nos. 2,876,197; 2,994,660; 2,962,881; 2,816,073; 2,793,996; 2,588,808; 3,244,638; 4,504,276; 4,509,950; 4,776,966; and 4,374,737. As indicated, the fatty acid soaps can be prepared in-situ in the fluid by the separate addition of the fatty acid and a base, such as calcium hydroxide (lime), to the fluid.

Typically used viscosifiers/suspending agents known in the art include organophilic clays (also known as "organoclays") and various polymers. Exemplary organoclays are set forth in the following U.S. patents, all incorporated herein by reference: U.S. Pat. Nos. 2,531,427; 2,966,506; 4,105,578; 4,208,218. U.S. Pat. No. 5,021,170 discloses mixtures of an organoclay and a sulfonated ethylene/propylene/5-phenyl-2-norborene terpolymer.

Exemplary weighting agents or weight materials include barite, galena, ilmenite, iron oxide, siderite, calcite, and the like.

SUMMARY OF THE INVENTION

The present invention provides a compounded hydrocarbon oil which is characterized by an increase in the low shear rate viscosity of the oil or mixing therewith an organophilic clay. The compounded hydrocarbon oil comprises a complex of propylene carbonate and a liquid fatty acid containing at least about 12 carbon atoms per molecule dispersed therein. The liquid fatty acid is preferably tall oil fatty acid. The complex has a volume ratio of propylene carbonate to liquid fatty acid from about 3.5 to 1 to about 7 to 1. The concentration of the complex in the hydrocarbon oil is from about 0.103 gal per 42 gal of the oil to about 0.305 gal per 42 gal of the oil.

The invention further provides a method of compounding a hydrocarbon oil such that an organophilic clay mixed therein will disperse to impart a low shear rate viscosity of at least 5,000 centipoise to the oil. The method comprises mixing with the hydrocarbon oil a polar additive and a coupler to disperse the polar additive throughout the hydrocarbon oil. Preferably the polar additive is propylene carbonate and the coupler is a liquid carboxylic acid containing at least 12 carbon atoms per mole, most preferably tall oil fatty acid. Preferably the concentration of propylene carbonate in the hydrocarbon oil is from about 0.09 gal per 42 gal of the oil to about 0.24 gal per 42 gal of the oil, and the concentration of the liquid carboxylic acid is from about 0.013 gal per 42 gal of the oil to about 0.065 gal per 42 gal of the oil. Most preferably the volume ratio of propylene carbonate to liquid carboxylic acid is from about 3.5 to 1 to about 7 to 1.

The invention further provides an oil base drilling fluid comprising the compounded hydrocarbon oil, an organophilic clay suspending agent, and an alkaline earth metal base selected from the group consisting of magnesium oxide, calcium oxide, calcium hydroxide, and mixtures thereof.

Other purposes, distinction over the art, advantages and features of this invention will be apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE INVENTION

As detailed hereinbefore, the invention herein involves hydrocarbon oil base drilling fluids in which an organophilic clay viscosifier/suspension additive mixed in a compounded oil readily disperses to increase the low shear rate viscosity of the oil to at least 5000 centipoise wherein the drilling fluid also contains an alkaline earth metal base selected from the group consisting of magnesium oxide, calcium oxide, calcium hydroxide, and mixtures thereof.

In the art of increasing the viscosity of oleaginous liquids with organophilic clays, it is known that the dispersion of the organophilic clay, and hence the viscosity of the oleaginous liquid, is increased by the addition of small polar organic materials to the clay/oleaginous liquid mixture. Such polar organic materials include ketones, alcohols, carbonates, amides, and the like such as acetone, methanol, ethanol, propylene carbonate, ethylene carbonate, formamide, and dimethylformamide. These are variously called polar activators or dispersants. See for example Mattingly U.S. Pat. No. 5,186,747.

In the absence of polar additive, elevated temperatures and/or very high shear energy is required to adequately disperse the organophilic clay. In invert (water-in-oil) emulsion drilling fluids, the aqueous phase generally functions to help disperse the organoclay and viscosity the oleaginous phase.

We have now found that a specifically compounded hydrocarbon oil can be utilized to prepare oil base drilling fluids.

The compounded hydrocarbon oil comprises a mixture of a hydrocarbon oil, propylene carbonate and a liquid fatty acid in certain specific concentrations. Preferably the liquid fatty acid contains at least 12 carbon atoms per molecule, most preferably 16-18. Most preferably the liquid fatty acid is tall oil fatty acid. The propylene carbonate and the liquid fatty acid combine to form a complex which disperses throughout the hydrocarbon oil forming a homogeneous mixture. The propylene carbonate and the liquid fatty acid, by themselves, are insoluble in the hydrocarbon oil and separate from the oil. The complex has a volume ratio of propylene carbonate to liquid fatty acid from about 3.5 to 1 to about 7 to 1. The concentration of the complex in the hydrocarbon oil is from about 0.103 gal/42 gal of oil to about 0.305 gal/42 gal of oil, i.e., the concentration of propylene carbonate is from about 0.09 gal/42 gal of oil to about 0.24 gal/42 gal of oil and the concentration of the liquid fatty acid is from about 0.013 gal/42 gal of oil to about 0.065 gal/42 gal of oil. Most preferably the volume ratio of propylene carbonate to tall oil fatty acid is 4 to 1.

The hydrocarbon oil may be any high boiling point, high flash point hydrocarbon oil generally used in the preparation of oil base muds. Preferred for environmental reasons are hydrocarbon oils which contain a very low concentration of aromatic hydrocarbons such as 0.1% by volume maximum, and preferably 0% aromatic hydrocarbons. Preferably the non-water soluble organic oil is a hydrocarbon such as alkanes (paraffins, isoparaffins) having the molecular formula $C_nH_{2n+2}$, alkenes (olefins, alpha olefins, polyalphaolefins) having the molecular formula $C_nH_{2n}$, various petroleum fractions such as mineral oils, white oils and the like. Most preferably, the hydrocarbon oil is a hydrogenated oil whose composition is saturated hydrocarbons (paraffins) of medium and high molecular weight. One such hydrocarbon oil is VASSA™ LP-90, a product of Vassa, Torre Pequiven, Piso-1, AV. Francisco de Miranda, Chocao, Caracas, Venezuela.

The compounded hydrocarbon oil is prepared by mixing the hydrocarbon oil with the propylene carbonate and the liquid fatty acid. The propylene carbonate and the liquid fatty acid can be added separately to the oil or pre-mixed together before adding to the oil. However, the propylene carbonate and the liquid fatty acid are not miscible with each other and it is preferred that they be separately added to the oil.

The drilling fluids of the invention comprise the compounded hydrocarbon oil, an organophilic clay viscosifier/suspension additive, and an alkaline earth metal base selected from the group consisting of magnesium oxide, calcium oxide, calcium hydroxide, and mixtures thereof.

The organophilic clay is a well known, commercially available viscosifier/suspension additive for organic liquids. Suitable organophilic clays are the reaction products of smectite-type clays and organic cations, i.e., quaternary ammonium cations. See for example Dino U.S. Pat. No. 6,187,719, incorporated herein by reference. The preferred smectite-type clay is selected from the group consisting of bentonite, hectorite, montmorillonite, biedellite, saponite, stevensite, and mixtures thereof, most preferably bentonite. The preferred quaternary ammonium cations are selected from the group consisting of methyl trihydrogenatedtallow ammonium, dimethyl dihydrogenatedtallow ammonium, dimethyl benzyl hydrogenatedtallow ammonium, methyl benzyl dihydrogenatedtallow ammonium, and mixtures thereof.

Exemplary commercially available organophilic clays include: BARAGEL 3000, BENTONE 38, BENTONE 155, BENTONE 34, BENTONE 128, BENTONE 990 and the like obtained from Rheox, Inc., P.O. Box 700, Hightstown, N.J. 08520, U.S.A.; TX-1178, TIXOGEL VP, THIXOGEL MP-100, TIXOGEL TE, and the like obtained from Sud-Chemie Rheologicals, United Catalysts, Inc., P.O. Box 32370, Louisville, Ky. 40232, U.S.A.; and CLAYTONE 40, CLAYTONE II, and the like obtained from Southern Clay Products, P.O. Box 44, 1212 Church Street, Gonzales, Tex. 78629, U.S.A.

The alkaline earth metal base functions to increase the low shear rate viscosity of the oil base drilling fluid. Preferably the alkaline earth metal base is magnesium oxide. The magnesium oxide is generally obtained by the calcination of magnesium carbonate. The reactivity of the magnesium oxide with acids or other reactants varies widely depending on the calcination temperature and calcination time. It is preferred that the magnesium oxide have an Activity Index less than about 15 seconds, most preferably less than about 10 seconds. The activity index of the magnesium oxide is obtained using the following test.

Principle

The rate at which magnesium oxide reacts with a dilute solution of acetic acid is used as a measure of activity. An excess of magnesia is used so that at the end point of the reaction, the solution goes from acidic to basic and is detected by a color change employing phenolphthalein indicator.

Apparatus and Reagents

Acetic acid solution 1.00±0.01N, standardized
Phenolphthalein soln. (1% solution in ethanol)
Waring blender, 2 speed with 32 oz. glass container
Balance with sensitivity of 0.01 gram
Stopwatch
Thermometer
Graduated cylinders, 100 ml and 500 ml Procedure 1. Prior to the test, the water and the acetic acid solution should be brought to a temperature of 25±1° C.
2. Weigh a 5.00±0.02 grams aliquot of the magnesia sample.
3. Measure out 300 ml of water in a graduated cylinder and add it to the blender.
4. Carefully hold a thermometer in the blender and run blender until the temperature of the water is 28° C. Turn off the blender.
5. Add 5-10 drops of phenolphthalein indicator solution.
6. Add the magnesia sample and immediately start the blender on low speed.
7. Count ten seconds from the start of the blender and add 100 ml of the 1.00N acetic acid solution. The stopwatch is started as the acid is being added.
8. Stop the timer when the solution turns to a definite pink color. Record the reaction time in seconds as the activity index of the magnesia.
9. Note: Add three to five additional drops of indicator solution to the blender every 30 seconds until the color change has taken place.

The drilling fluids of this invention may contain other additives currently available in the industry such as water-in-oil emulsifiers, oil wetting agents, fluid loss control additives, aqueous liquids, weighting agents, bridging agents, and the like.

In addition to the bridging agents known in the art, magnesium oxide having an Activity Index greater than about 800 seconds is disclosed in co-pending International Application No. PCT/US2004/033237 filed Oct. 8, 2004, incorporated herein by reference, as a bridging agent in aqueous, polymer-containing well drilling and servicing fluids. In the oil base fluids of the present invention, the useful magnesium oxide bridging particles are not dependent upon the Activity Index of the particles since they are insoluble in the hydrocarbon base fluid.

The fluids of the invention are useful in various petroleum recovery operations such as well drilling, including drilling into hydrocarbon-containing formations, completion, workover and the like all as are well known in the art. Specifically the fluids of the invention are useful in drilling a well wherein the drilling fluid is circulated within a borehole being drilled as drilling proceeds, and in well completion and workover methods wherein a subterranean formation is contacted with a fluid to form a bridge and seal on the formation, all as are well known in the art.

The invention will be understood in light of the following specific examples, which are merely illustrative and should not be construed as limiting the invention in any respect, as will be evident to those skilled in the art.

In these examples and this specification, the following abbreviations may be used: ml=milliliters; cc=cubic centimeters; g=grams; gal=gallon (U.S.); cp=centipoise; sec=seconds; min=minutes; psi=pounds per square inch; rpm=revolutions per minute; lb/bbl=pounds per 42 gallon barrel; API=American Petroleum Institute; PV=API plastic viscosity in centipoises; YP=API yield point in pounds/100 square feet; GS=API gel strength in pounds per 100 square feet; HITHP=API high temperature high pressure fluid loss at 300° F. and 500 psi; HR=hot roll for 16 hours; LSRV=Brookfield Model LVTDV-1 viscometer, having a number 2 or 3 spindle, low shear rate viscosity at 0.3 rpm, 0.0636 sec$^{-1}$, in centipoise.

Example 1

To 350 cc of VASSA LP-90 hydrocarbon oil was added 1 cc of propylene carbonate while mixing with an overhead mixer at low shear. The propylene carbonate settles out. Tall oil fatty acid is then added while mixing in concentrations of 0.1 cc, 0.25 cc, 0.3 cc and 0.5 cc. The propylene glycol only stayed in solution with the 0.25 cc addition of tall oil fatty acid. Thus the compounded hydrocarbon oil contains 1 cc of propylene carbonate/350 cc of oil and 0.25 cc of tall oil fatty acid per 350 cc of oil. The volume ratio of propylene carbonate to tall oil fatty acid is 4.

Example 2

A compounded hydrocarbon oil was prepared by mixing together on an overhead mixer 252 cc of VASSA® LP-90 hydrocarbon oil, 1.0 cc propylene carbonate, and 0.25 cc tall oil fatty acid. To this compounded oil while mixing were added 7.5 grams of CLAYTONE® II organophilic clay (10.4 lb/bbl) and the mixing continued for 10 minutes. Thereafter the low shear rate viscosity at 0.0636 sec$^{-1}$ was obtained with a BROOKFIELD® Model LVTDV-1 viscometer having a number 2 or 3 spindle at 0.3 revolutions per minute. As is well known, the low shear rate viscosity is indicative of the suspension properties of the fluid, the larger the low shear rate viscosity, the better is the suspension of solids in the fluid. The low shear rate viscosity was recorded as the "peak" (highest viscosity attained) viscosity and the viscosity after 2 minutes mixing in the viscometer. The "peak" low shear rate viscosity was 51,000 centipoise and the 2 minute viscosity was 27,500 centipoise. For comparison, a fluid containing only 252 cc of VASSA® LP-90 and 10-20 grams of CLAYTONE® II had 0 (zero) low shear rate viscosity. A fluid containing only 252 cc of VASSA® LP-90 oil, 7.5 grams of CLAYTONE® II, and either 7 cc or 35 cc of water had low shear rate viscosities (both peak and 2 minutes) of 20 and 60, respectively.

Example 3

To 311.5 cc of the compounded oil of Example 1 were added 7.5 grams of CLAYTONE® II organophilic clay. After mixing 10 minutes with an overhead mixer there were added other additives as follows: 0.3 cc oil wetting agent, mixed 5 minutes; 4 grams of THERMASAL B magnesium oxide having an Activity Index of 7-9 seconds, a product of TBC-Brinadd, Houston, Tex., mixed 5 minutes; 3 grams STAB DP2 fluid loss control agent, a product of Quim Export, Inc., Houston, Tex., mixed 10 minutes; and 165 grams barite weighting agent, mixed 10 minutes.

The rheological and fluid loss characteristics of the fluid were evaluated initially and after hot rolling at 300° F. for 16 hours. The data obtained are set forth in Table A.

Example 4

A drilling fluid was prepared as in Example 3 except that the fluid contained 6 grams of THERMASAL B magnesium oxide and 10 grams of gilsonite fluid loss control additive (no STAB DP2). The fluid was evaluated a in Example 3. The data obtained are set forth in Table A.

TABLE A

| | API RP 13-B | | | |
|---|---|---|---|---|
| | Example 3 | | Example 4 | |
| Fann Rheology Dial Readings | INITIAL | HR @ 148.9° C. | INITIAL | HR @ 148.9° C. |
| 600 | 32 | 73 | 31 | 51 |
| 300 | 20 | 53 | 20 | 33 |
| 200 | 13 | 36 | 16 | 25 |
| 100 | 8 | 25 | 12 | 17 |
| 6 | 3 | 8 | 8 | 6 |
| 3 | 2 | 7 | 7 | 4 |
| PV | 12 | 20 | 11 | 18 |
| YP | 8 | 33 | 9 | 15 |
| 10 sec GS | 2 | 10 | 15 | 7 |
| 10 min GS | 5 | 25 | 20 | 18 |
| LSRV, cp | 8140 | 69,600 | 33,900 | 19,100 |
| HTHP | | | | |
| Spurt, cc | Trace | Trace | Trace | 2.0 |
| 30 min, cc | 12.0 | 8.0 | 9.0 | 34.0 |

Example 5

To 350 cc of the compounded oil in Example 1 were added 7.5 grams of CLAYTONE® II organophilic clay. After mixing 5 minutes, the LSRV was obtained. Thereafter, 1 gram of THERMASAL B magnesium oxide was added, the mixing continued for 5 minutes, and the LSRV again obtained. Thereafter the addition of THERMASAL B in 1 gram increments was continued until a total of 6 grams had been added. The data obtained are set forth in Table B.

Example 6

350 cc of the compounded oil of Example 1 were added 2.0 g of CLAYTONE® II organoclay. After mixing 5 minutes, the LSRV was obtained. Thereafter the addition of CLAYTONE® II was continued in 1 g increments until a total of 5 g had been added. The data obtained are set forth in Table C.

TABLE B

| THERMASAL B | LSRV, cp | |
|---|---|---|
| g (lb/bbl) | "Peak" | 2 Minute |
| 0 | 24,200 | 24,200 |
| 1 | 8,520 | 6,540 |
| 2 | 1,280 | 1,280 |
| 3 | 11,500 | 11,500 |

TABLE B-continued

| THERMASAL B | LSRV, cp | |
| --- | --- | --- |
| g (lb/bbl) | "Peak" | 2 Minute |
| 4 | 70,500 | 58,000 |
| 5 | 109,000 | 90,000 |
| 6 | 150,000 | 150,000 |

TABLE C

| CLAYTONE ® II | LSRV, cd | |
| --- | --- | --- |
| g (lb/bbl) | "Peak" | 2 Minute |
| 2 | 960 | 960 |
| 3 | 3,060 | 3,060 |
| 4 | 7,840 | 7,840 |
| 5 | 13,860 | 13,860 |

What is claimed is:

1. A compounded hydrocarbon oil composition consisting of:
   a base hydrocarbon oil; and,
   a complex of propylene carbonate and a liquid fatty acid containing at least about 12 carbon atoms per molecule dispersed therein,
   wherein the complex has a volume ratio of propylene carbonate to liquid fatty acid ranging from about 3.5:1 to about 7:1, and
   wherein the compounded hydrocarbon oil is characterized by an increase in the low shear rate viscosity of the oil of at least 5,000 centipoise upon mixing 7.5 lb/bbl of an organophilic clay therein.

2. The compounded hydrocarbon oil of claim 1 wherein the concentration of the propylene carbonate is from about 0.09 gal/42 gal of oil to about 0.24 gal/42 gal of oil, and wherein the concentration of the liquid fatty acid is from about 0.013 gal/42 gal of oil to about 0.065 gal/42 gal of oil.

3. The compounded hydrocarbon oil of claim 1 or 2, wherein the liquid fatty acid is tall oil fatty acid.

4. A method of compounding a hydrocarbon oil consisting of a base hydrocarbon oil and a complex of propylene carbonate and a liquid fatty acid containing at least 12 carbon atoms, the method of which comprises:
   mixing with the base hydrocarbon oil a polar additive in a concentration amount ranging from about 0.09 gal/42 gal of oil to about 0.24 gal/42 gal, of oil and a coupler in a concentration amount ranging from about 0.013 gal/42 gal of oil to about 0.065 gal/42 gal of oil, so as to disperse the polar additive throughout the hydrocarbon oil,
   wherein the polar additive is propylene carbonate; and
   wherein the coupler is a liquid carboxylic acid containing at least twelve carbon atoms per molecule,
   and wherein the volume ratio of polar additive to the coupler is from about 3.5:1 to about 7:1.

5. The method of claim 1 or 4 wherein the liquid carboxylic acid is tall oil fatty acid.

6. The compounded hydrocarbon oil of claim 1, wherein the volume ratio of the propylene carbonate to the liquid fatty acid is about 4:1, and wherein the liquid fatty acid is tall oil fatty acid.

7. The compounded hydrocarbon oil of claim 6 wherein the base hydrocarbon oil is a mixture of paraffinic hydrocarbons.

8. The method of claim 4 wherein the volume ratio of the propylene carbonate to the liquid carboxylic acid is about 4:1, and wherein the liquid carboxylic acid is tall oil fatty acid.

9. The method of claim 8 wherein the base hydrocarbon oil is a mixture of paraffinic hydrocarbons.

* * * * *